United States Patent
Feehrer et al.

(10) Patent No.: US 10,983,921 B2
(45) Date of Patent: Apr. 20, 2021

(54) INPUT/OUTPUT DIRECT MEMORY ACCESS DURING LIVE MEMORY RELOCATION

(71) Applicant: Oracle International Corporation, Redwood Shores, CA (US)

(72) Inventors: John Feehrer, Westford, MA (US); Patrick Stabile, Everett, MA (US); Gregory Onufer, Palo Alto, CA (US); John Johnson, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/780,822

(22) Filed: Feb. 3, 2020

(65) Prior Publication Data
US 2020/0174946 A1    Jun. 4, 2020

Related U.S. Application Data

(63) Continuation of application No. 15/444,795, filed on Feb. 28, 2017, now Pat. No. 10,552,340.

(51) Int. Cl.
*G06F 12/1081* (2016.01)
*G06F 3/06* (2006.01)
*G06F 13/28* (2006.01)

(52) U.S. Cl.
CPC ........ *G06F 12/1081* (2013.01); *G06F 3/0604* (2013.01); *G06F 3/0617* (2013.01); *G06F 3/0625* (2013.01); *G06F 3/0631* (2013.01); *G06F 3/0647* (2013.01); *G06F 3/0673* (2013.01); *G06F 13/28* (2013.01); *G06F 2212/1016* (2013.01); *G06F 2212/1032* (2013.01); *G06F 2212/154* (2013.01); *Y02D 10/00* (2018.01)

(58) Field of Classification Search
CPC .. G06F 12/1081; G06F 3/0604; G06F 3/0617; G06F 3/0647; G06F 3/0673; G06F 13/28; G06F 3/0625; G06F 3/0631; G06F 2212/154; G06F 2212/1016; G06F 2212/1032; Y02D 10/00
USPC ............................. 710/3-4, 20, 22, 26, 308
See application file for complete search history.

(56) References Cited

U.S. PATENT DOCUMENTS

| | | | |
|---|---|---|---|
| 5,317,704 A | 5/1994 | Izawa et al. | |
| 5,752,015 A | 5/1998 | Henry et al. | |
| 5,784,630 A * | 7/1998 | Saito | G06F 9/30087 712/30 |

(Continued)

*Primary Examiner* — Idriss N Alrobaye
*Assistant Examiner* — Henry W Yu
(74) *Attorney, Agent, or Firm* — Kowert, Hood, Munyon, Rankin & Goetzel, P.C.

(57) ABSTRACT

A method and apparatus for performing memory access operations during a memory relocation in a computing system are disclosed. In response to initiating a relocation operation from a source region of memory to a destination region of memory, copying one or more lines of the source region to the destination region, and activating a mirror operation mode in a communication circuit coupled to one or more devices included in the computing system. In response to receiving an access request from a device, reading previously stored data from the source region, and in response to determining the access request includes a write request, storing new data included in the write request to locations in both the source and destination regions.

20 Claims, 10 Drawing Sheets

(56) References Cited

U.S. PATENT DOCUMENTS

| | | | |
|---|---|---|---|
| 6,438,557 B1* | 8/2002 | Dent | G06F 9/4881 |
| | | | 712/223 |
| 6,499,091 B1* | 12/2002 | Bergsten | G06F 11/2082 |
| | | | 707/999.202 |
| 7,304,959 B1 | 12/2007 | Swaroop et al. | |
| 7,552,319 B2 | 6/2009 | Matheny | |
| 7,761,594 B1 | 7/2010 | Mowat | |
| 8,381,003 B2 | 2/2013 | Suzuki | |
| 2005/0289314 A1 | 12/2005 | Adusumilli et al. | |
| 2009/0282300 A1 | 11/2009 | Heyrman | |
| 2011/0083026 A1* | 4/2011 | Mikami | G06F 1/3203 |
| | | | 713/323 |
| 2011/0310691 A1 | 12/2011 | Zhou et al. | |
| 2013/0332558 A1 | 12/2013 | Condict et al. | |
| 2013/0332634 A1* | 12/2013 | Glaser | G06F 13/4286 |
| | | | 710/104 |
| 2014/0047263 A1 | 2/2014 | Coatney et al. | |
| 2014/0082251 A1* | 3/2014 | Li | G06F 13/4018 |
| | | | 710/316 |
| 2015/0052327 A1 | 2/2015 | Ancajas | |
| 2015/0089185 A1 | 3/2015 | Brandyberry et al. | |
| 2015/0234617 A1* | 8/2015 | Li | G06F 3/0617 |
| | | | 711/114 |
| 2016/0062442 A1* | 3/2016 | Burstein | G06F 1/324 |
| | | | 713/320 |

* cited by examiner

INPUT/OUTPUT DIRECT MEMORY ACCESS DURING LIVE MEMORY RELOCATION

PRIORITY INFORMATION

The present application is continuation of U.S. application Ser. No. 15/444,795, filed Feb. 28, 2017, which is incorporated by reference herein in its entirety

BACKGROUND

Technical Field

Embodiments described herein are related to the field of integrated circuit design, and more particularly to input/output direct memory accesses.

Description of the Related Art

Computing systems may include multiple processors or nodes, each of which may include multiple processor cores. Such computing systems may also include one or more memories for storing data. In some cases, a processor or processor core may retrieve (commonly referred to as "reading") program instructions or program data previously stored in a physical memory location. Alternatively, a processor or processor core may store (commonly referred to as "writing") a result of an operation in a location in memory.

Computing systems may also include various Input/Output (I/O) devices that send data to or receive data from the physical memory associated with a processor or processor core. For example, I/O devices may include ethernet network interface cards (NICs) that allow the processors of a particular computing system to communicate with other computing systems, as well as external peripherals such as printers, for example. Various forms of storage devices, such as, e.g., mechanical and solid-state disk drives, and the like, may also be included with a computing system.

In some cases computing systems may support changes in hardware configuration without disrupting the execution of user applications. Such changes in hardware configuration may include the removal, replacement, or addition of a processor, a memory, an I/O device, and the like.

SUMMARY OF THE EMBODIMENTS

Various embodiments of a method for performing memory access during a memory relocation operation are disclosed. Broadly speaking, an apparatus and a method are disclosed in which a circuit is configured to receive an access request for a memory, where the access request includes a logical address, and the memory includes a source region and a destination region. The circuit may be further configured to, in response to a determination that a mirror operation mode has been enabled, retrieve previously stored data from the source region using the logical address. In response to a determination that the access request includes a write request, the circuit may be further configured to store new data in a first location in the source region and a second location in the destination, wherein the first and second locations correspond to the logical address, otherwise the circuit may be further configured to return the previously stored data to a device which originated the access request.

In another embodiment, the circuit may be further configured to modify status data bits associated with the second location.

In another non-limiting embodiment, in response to a determination that the access request includes a partial fill write request, the circuit may be further configured to merge the previously stored data with the new data to generate merged data, and store the merged data into the first location and the second location.

BRIEF DESCRIPTION OF THE DRAWINGS

The following detailed description makes reference to the accompanying drawings, which are now briefly described.

Figure 1:
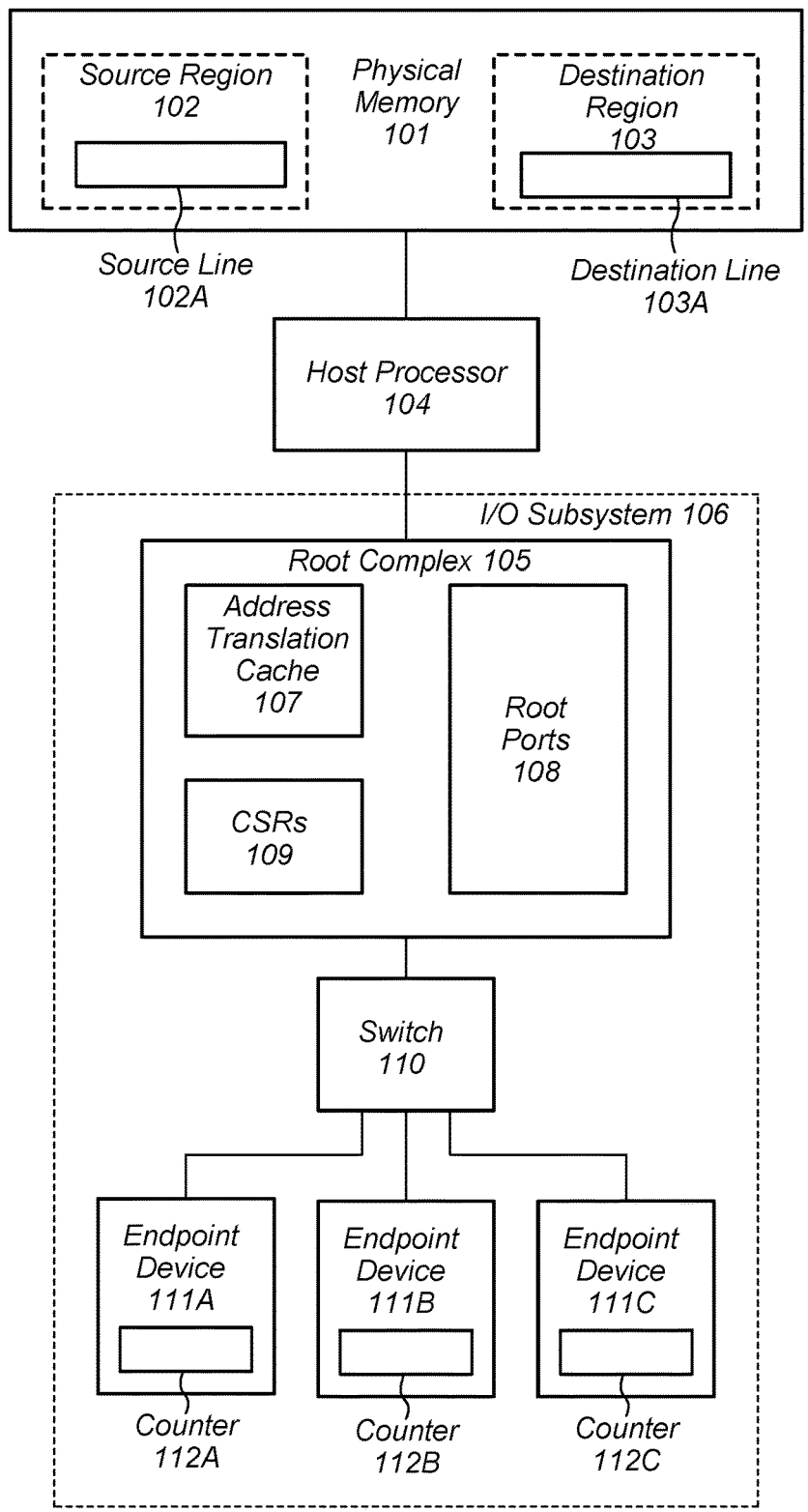
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In some servers that are divided into multiple physical domains, dynamic reconfiguration may be employed to allow for the removal and replacement of system resources without disrupting user applications. Such reconfiguration may increase a systems availability during naturally occurring hardware faults or upgrades to system firmware.

To perform certain types of reconfiguration, memory relocation may be performed. As used and described herein, memory relocation is the transfer of the contents of a particular region of physical memory to a new location in the physical memory under the supervision of a privileged system software. Once the contents of the particular region of the physical memory have been copies, the privileged system software may remove (also referred to herein as "evacuate") the particular region of the physical memory. The particular region may then be reassigned to a different domain within the system, or physically removed from the system.

During memory relocation, some systems suspend input/output (I/O) transactions initiated by I/O devices, such as, e.g., Ethernet interface cards, storage adapters, InfiniBand adapters, and the like. Such suspensions can result timeouts for the I/O devices, which may lead to operating system (OS) panics as well as other system errors. The embodiments illustrated in the drawings and described below may provide techniques to perform memory relocation while limiting device timeouts.

An embodiment of a computing system is illustrated in the block diagram of FIG. 1. In the illustrated embodiments, computing system 100 includes Physical Memory 101, Host Processor 104, and I/O Subsystem 106. Although single instances of Physical memory 101, Host Processor 104, and I/O Subsystem 106 are depicted in the block diagram of FIG. 1, in other embodiments, any suitable number of any of the aforementioned circuit blocks may be employed.

Physical Memory 101 may be configured to store program instructions, operand data, or any other data to be processed or used by computing system 100. In the illustrated embodiment, Physical Memory 101 includes Source Region 102 and Destination Region 103, each of which may be specified by a particular range of addresses. Each of Source Region 102 and Destination Region 103 are organized into a multiple cache lines. For example, Source Region 102 includes Source Line 102A and Destination Region 103 includes Destination Line 103A. Although only a single cache line is depicted in each of Source Region 102, in other embodiments, any suitable number of cache lines may be employed.

During operation, it may be desirable to move data stored in Source Region 102 to Destination Region 103. Such a movement of data may be in response to a detection of a failure within Source Region 102, or to allow the memory resources included within Source Region 102 to be reallocated to a different process, different guest operating system (GOS), and the like. In some cases, when data is to be moved a supervisory layer of software, such as, e.g., Hypervisor, may halt certain operations of any processors in the system, such as, e.g., Host Processor 104, and then copy on a line-by-line basis, the data from Source Region 102 to Destination Region 103. As described below in more detail, memory write accesses received from I/O Subsystem 106 may be mirrored into both Source Region 102 and Destination Region 103 to ensure that new data from I/O Subsystem 106 is properly stored during the relocation operation.

In the present disclosure, Physical Memory 101 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory (NVM, including NVDIMM technology), for example. Physical Memory 101 may include any suitable number of physical integrated circuits or chips, and Source Region 102 and Destination Region 103 may be mapped to respective collections of such physical integrated circuits.

Host Processor 104 may be configured to executed program instructions stored in Physical Memory 101. Additionally, Host Processor 104 may be configured to receive memory access requests from I/O Subsystem 106 and relay the received requests to Physical Memory 101. In the case of read access, Host Processor 104 may relay data retrieved from Physical Memory 101 to I/O Subsystem 106.

As used and described herein, a processor or processor core may, in various embodiments, be representative of a general-purpose processor that performs computational operations. For example, a processor may be a central processing unit (CPU) such as a microprocessor, a microcontroller, an application-specific integrated circuit (ASIC), or a field-programmable gate array (FPGA).

I/O Subsystem 106 may include multiple devices and communication circuits that communicate with Host Processor 104. For example, in the present embodiment, I/O Subsystem 106 includes Root Complex 105, Switch 110, and Endpoint Devices 111A-C.

As used and described herein, a Root Complex is particular type of communication circuit that may be configured to receive memory access requests from devices included in a computing system, and relay those requests to system memory. The Root Complex may, in some embodiments, comply with an industry-standard architecture, such as, PCI-Express, for example. In the present embodiment, Root Complex 105 includes Address Translation Cache 107, control status registers (CSRs) 109, and Root Ports 108, and may be configured to relay memory access requests from Endpoint Devices 111A-C to Host Processor 104. In some embodiments, Root Complex 105 may translate memory access requests from a communication protocol used by Endpoint Devices 111A-C to a communication protocol employed by Host Processor 104.

During operation, Root Complex 105 may receive a request to access a particular location in Physical Memory 101 from one of Endpoint Devices 111A-C. In various embodiments, the request includes a logical address, which Root Complex 105 may convert to a physical address my checking a portion of a logical-to-physical address map stored in Address Translation Cache 107. If the logical address is not present in the portion of the logical-to-physical address stored in Address Translation Cache 107, Root Complex 105 may perform a translation table walk on the complete table, which may be stored in Physical Memory 101. Address Translation Cache 107 may be designed according to one of various design methodologies and include multiple data storage circuits, such as, e.g., SRAM memory cells, latches, and the like.

In some cases, data from Source Region 102 may be relocated to Destination Region 103. Prior to the start of the relocation, CSRs 109 may be programmed with address ranges, which define Source Region 102 and Destination Region 103. Root Complex 105 may check an address associated with a memory access request received from one of Endpoint Devices 111A-C against an address range stored in CSRs 109 to determine if the memory access request falls within Source Region 102. If the memory access request is outside of Source Region 102, Root Complex 105 may proceed with processing the access request. CSRs 109 may be designed according to one of various design styles, and may include multiple flip-flop, latches, or any other suitable data storage circuit.

Alternatively, if the memory access request falls within the address range of Source Region 102, Root Complex 105 may employ write mirroring (also referred to herein as "DMA write mirroring"). As described below in more detail, when using write mirroring, Root Complex 105 may store data received from one of Endpoint Devices 111A-C, in a line in Source Region 102 corresponding to the address of the memory access, as well as in a corresponding line in Destination Region 103. Root Complex 105 may additionally check and updated status bits, such as those described below in regard to FIG. 2, during the mirror write process.

Switch 110 may include any suitable combination of logic circuits configured to select a particular memory access request received from one of Endpoint Devices 111A-C, and relay the particular memory access request for processing. In the case of a read access request, Switch 110 may relay data retrieved in response to the read request from Root Complex 105 to a particular one of Endpoint Devices 111A-C, which originated the read access request. Although a single switch is depicted in the embodiment of FIG. 1, in other embodiments additional switches may be employed.

Endpoint Devices 111A-C may, in some embodiments, include magnetic, optical, or solid-state storage media such as hard drives, optical disks, non-volatile random-access memory devices, etc. In other embodiments, Endpoint Devices 111A-C may include more complex storage devices such as disk arrays or storage area networks (SANs), which may be coupled to Switch 110 via a standard Small Computer System Interface (SCSI), a Fibre Channel interface, a Firewire® (IEEE 1394) interface, PCIe, or another suitable interface. Additionally, it is contemplated that in other embodiments, any other suitable endpoint devices may be coupled to Switch 110, such as multi-media devices, graphics/display devices, standard input/output devices, etc.

Each of Endpoint Device 111A-C include a counter, Counters 112A-C, respectively, used to track a duration of a particular memory access request. When a particular one of Endpoint Devices 111A-C issues a memory access request through Switch 110 to Root Complex 105, the corresponding one of Counters 112A-C begins to track an amount of time before a response to the memory access request is received. If a response to the memory access request is not received before the value of the corresponding one of Counters 112A-C reaches a threshold value, the particular one of Endpoint Devices 111A-C may signal a timeout error condition to computing system 100.

It is noted that the embodiment depicted in FIG. 1 is merely an example. In other embodiments, different numbers, different types, and different arrangements of circuit blocks are possible and contemplated.

As previously mentioned, source and destination regions in memory may be organized into multiple cache lines (or simply "lines"). To assist in a memory relocation operation, individual lines may include metadata along with the actual stored data. An example of a line that includes metadata is depicted in the block diagram of FIG. 2. In the illustrated embodiment, line 200 includes Data 201 and Metadata 204.

Data 201 may include any suitable number of data bits configured to store a desired amount of data. For example, one or more program instructions may be stored in Data 201. Alternatively, operands or results from operations may be read from or stored into Data 201. When Data 201 is updated with new data, Metadata 204 may also be updated to reflect the status of the newly stored data.

Metadata 204 includes Version Data Bits 202 and Memory Access Protection (MAP) Bits 203. In various embodiments, Version Data Bits 202 includes any suitable number of data bits configured to store information that limits a program from accessing line 200 if line 200 is outside a range of memory allocated to the program. In some cases, a particular value may be stored in Version Data Bits 202 to aid in initialization operations as part of a memory relocation procedure. The particular value may be referred to as a Universal Match (UM) value, and may indicate that access to the line associated with the UM version data bits will match any version of tag bits associated with a virtual address used in the access.

Memory Access Protection Bits 203 includes any suitable number of data bits configured to store two different types of information. Data stored in Memory Access Protection Bits 203 may be used to determine if access to the line 200 is permitted. Additionally, the data stored in Memory Access Bits 203 may be used to determine if access to line 200 is read-only, or if access to line 200 includes both read and write access.

Figure 2:
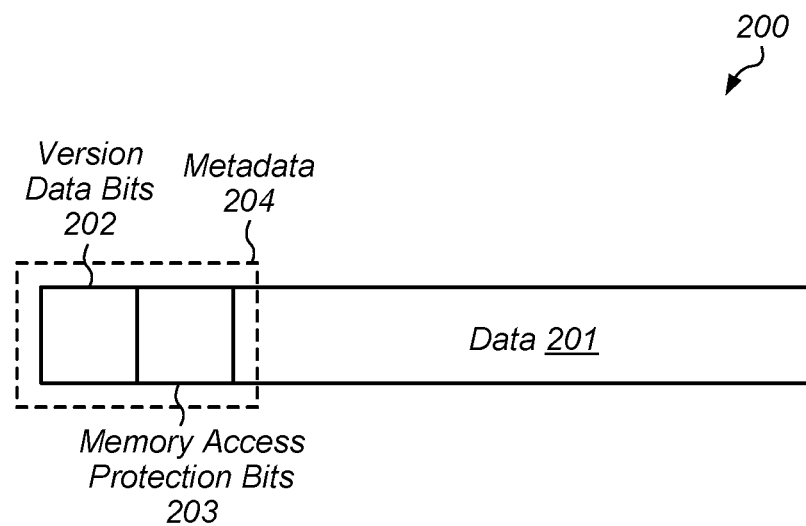
FIG. 2 illustrates a block diagram of a cacheline stored in memory.

As described below in more detail, Metadata 204 may be used in conjunction with mirror operation during a memory relocation. It is noted that the line depicted in FIG. 2 is merely an example. In other embodiments, different types and different quantities of metadata may be employed.

Figure 3:
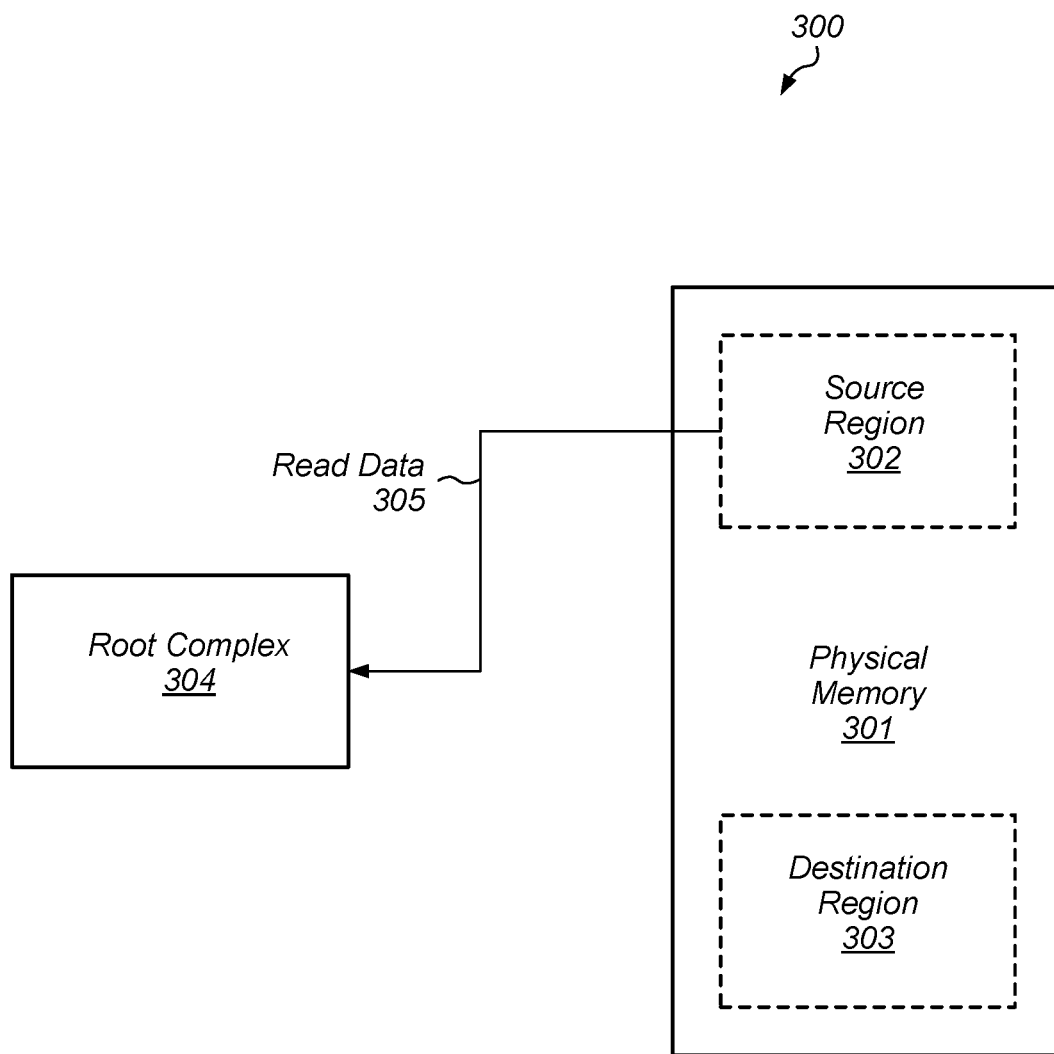
FIG. 3 illustrates a block diagram depicting a read operation during memory relocation with mirror operation mode enabled.

As described above, memory access requests may be handled in a different fashion while a memory relocation operation is in being performed. A block diagram of a memory read during memory relocation is depicted in FIG. 3. The present embodiment includes Root Complex 304 and Physical Memory 301, which may correspond to Root Complex 105 and Physical Memory 101, respectively. In the illustrated embodiment, Root Complex 304 receives a memory read access request from a device, such as, Endpoint Device 111A, for example. In various embodiments, the memory read access request may be relayed via one or more switches, such as, e.g., Switch 110, before arriving at Root Complex 304.

As described below in more detail, Root Complex 304 has be setup as part of initiating mirror operation during memory relocation. Upon receiving the memory read access, Root Complex 304 determines a physical address associated with the read access request. In various embodiments, Root Complex 304 may initiate a hardware table walk to find a translation map entry allowing a virtual or logical address associated with the memory read access request to be translated to a corresponding physical address in Source Region 302 of Physical Memory 301. Once located, the translation map entry may then be installed into Address Translation Cache 107.

During the memory relocation operation, lines are being copied by system software or firmware, such as, e.g., Hypervisor privileged OS, from Source Region 302 to Destination Region 303. Since the memory read access requests does not modify any data, the requested data from Root Complex 105 may be read from Source Region 302 as the data stored in Source Region 302 will remain until the up to date until the mirroring associated with the memory relocation operation is completed.

Root Complex 304 will issue a read operation to the physical memory location for the line associated with the virtual or logical address received with the memory read access request. A processor, such as, e.g., Host Processor 104, included in the computing system may retrieve Read Data 305 from Source Region 302 in response to the read operation issued by Root Complex 304. It is noted that other circuits, such as, e.g., processors, memory controllers, buffers, and the like, through which the read operation and Read Data 305 flow, have been omitted from FIG. 3 for clarity.

Upon receiving Read Data 305, Root Complex 304 may relay Read Data 305 to the device that originated the memory read request.

Although a single Root Complex is depicted in the block diagram of FIG. 3, in other embodiments, any suitable number of Root Complexes may be employed. When multiple Root Complexes are employed, each Root Complex may operate in a similar fashion to the embodiment illustrated in FIG. 3, and may be setup for mirroring mode in a manner similar to that described for the embodiment depicted in FIG. 3.

Figure 4:
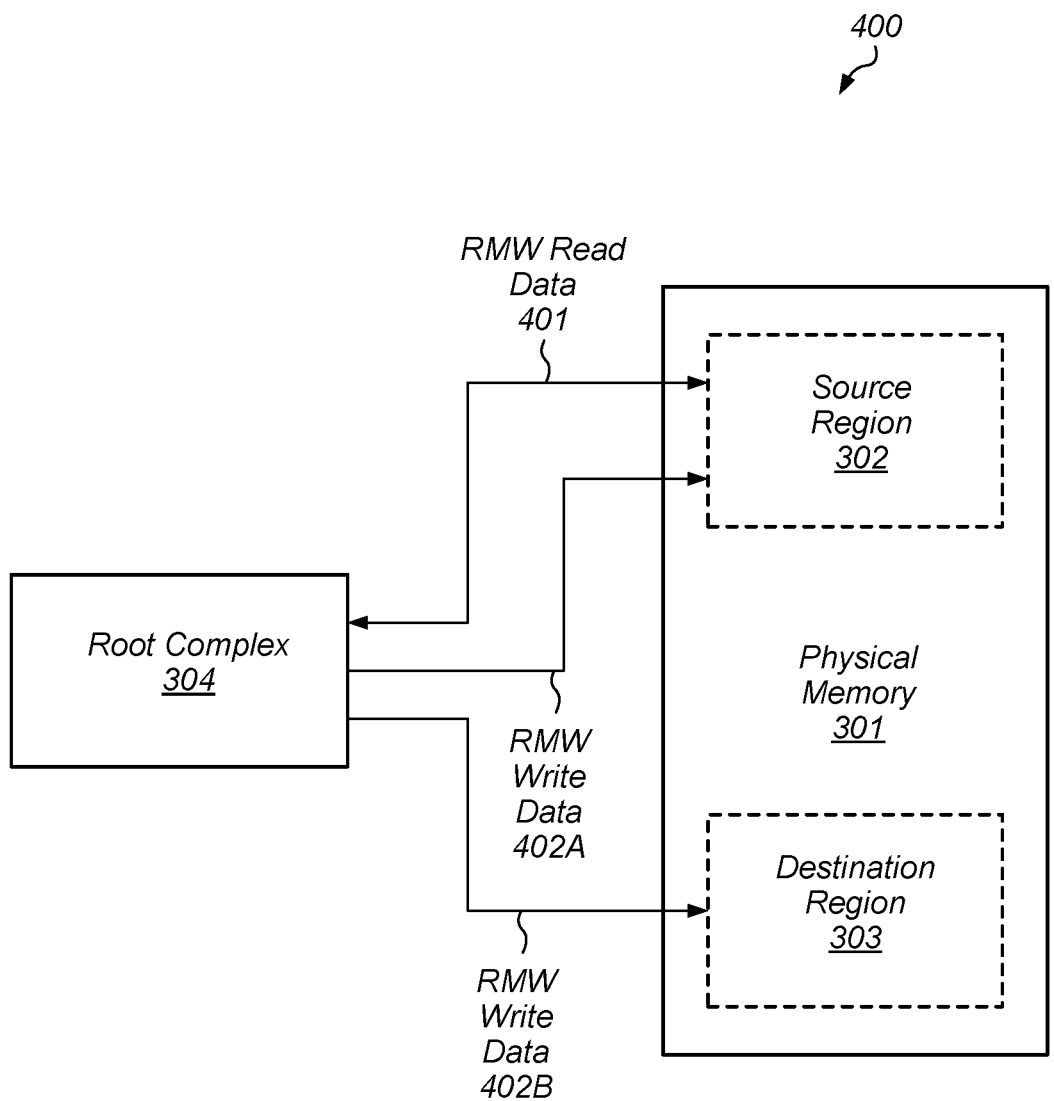
FIG. 4 illustrates a block diagram depicting a read-modify-write operation during memory relocation with mirror operation mode enabled.

Write operations resulting from I/O memory access request during a relocation operation are handled differently than the read operations described above. Write operations are handled using read-modify-write operations in order to preserve atomicity of the modifications made to contents of Physical Memory 301. The use of read-modify-write operations may additionally avoid race conditions and inconsistent behaviors across multiple Root Complexes reading and writing data to Source Region 102. A block diagram depicting the use of such read-modify-write requests is illustrated in FIG. 4.

When Root Complex 304 receives a write request, a read of the line corresponding the address of the write request is issued starting the read-modify-write (RMW) operation. RMW Read Data 401 may be returned from Source Region 302 to Root Complex 304 in response to the read operation. During this time, Root Complex 304 may additionally check version data bits associated with a line in Destination Region 303 that corresponds to the line in Source Region 302, from which the data was read. The values of version data bits may be used to determine if MAP bits associated with the line in the Destination Region are to be updated upon completion of the write operation.

In the case of a partial line fill, the data received with the write request is merged with RMW Read Data 401 to generate RMW Write Data 402A and RMW Write Data 402B. If the write request is a full line fill, then the data received with the write request is used for both RMW Write Data 402A and RMW Write Data 402B. The Root Complex may then perform a mirror write operation writing RMW Write Data 402A to the specified line in Source Region 302 and RMW Write Data 402B to the corresponding line in Destination Region 303.

By writing data to both Source Region 302 and Destination Region 303, Root Complex 304 ensures that the new data will be handled correctly during the system software/firmware memory relocation operation. By using the values of the version data bits associated with the target line in Destination Region 303, Root Complex 304 may modify the MAP bits of the target line. As described below in more detail, by selectively setting the MAP bits to read-only status, Root Complex 304 may prevent the computing system software from overwriting the newly updated target line during the memory relocation operation.

It is noted that the block diagram of FIG. 4 is merely an example. In other embodiments, different numbers of root complexes and physical memories are possible and contemplated.

Figure 5:
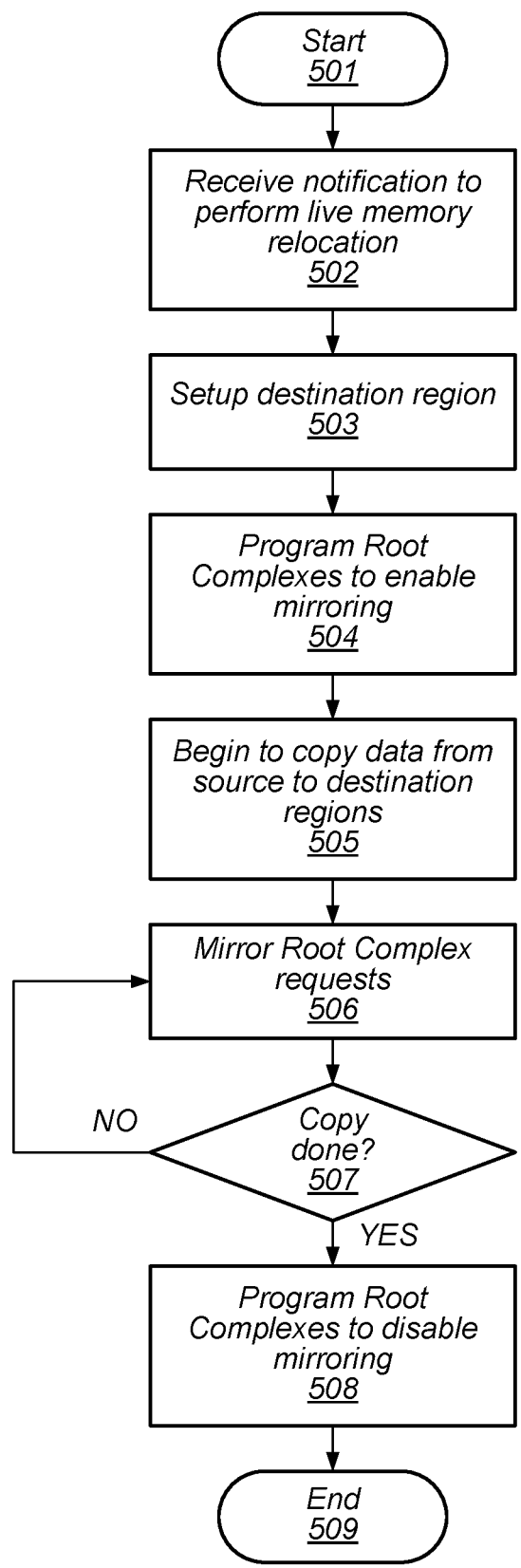
FIG. 5 illustrates a flow diagram depicting an embodiment of a method for mirroring memory regions during memory relocation.

Turning to FIG. 5, a flow diagram depicting an embodiment of a method for software performing live memory relocation is illustrated. Referring collectively to FIG. 1 and the flow diagram of FIG. 5, the method begins in block 501.

Host Processor 101 may receive a notification to perform a live memory transfer (block 502). In various embodiments, the notification may be a result of a determination that an error rate of a portion of Physical Memory 101 is exceeding a threshold value. Alternatively, the notification may be the result of privileged system software evacuating a portion of Physical Memory 101 to allow the portion of Physical Memory 101 to be reassigned to a different domain or removed from system 100. In various embodiments, the reassignment or removal of the portion of Physical Memory 101 may reduce power consumption as well as provide support for cloud computing elasticity and quality-of-service requirements.

In preparation for the relocation, Host Processor 101 may then setup Destination Region 103 (block 503). Executing instructions from privileged system software, Host Processor may write logical-0 values to all locations included in Destination Region 103. By storing logical-0 values, the MAP bits are set to indicate "read/write" at each location, and the version tag for each location may be set to the UM value.

Root Complex 105 may then be setup for mirroring (block 504). In some embodiments, each virtual machine being executed by system 100 may begin executing an idle instruction loop (commonly referred to as being placed in a "spin state"). As described below in more detail, various steps may be performed to setup Root Complex 105 including, but not limited to, modifying values in CSRs 109.

Once Root Complex 105 is setup for mirroring, Host Processor 101 may begin copying data from Source Region 102 to Destination Region 103 (block 505). As described below in more detail, Host Processor 101 may check version bits of lines in Destination Region 103 prior to copying a corresponding line from Source Region 102.

During the copy process from Source Region 102 to Destination Region 103, Root Complex 105 may receive I/O requests from any of Endpoint Devices 111A-C. In the case of a write request, the request is mirrored to both Source Region 102 and Destination 103 (block 506). As described below in more detail, write requests may also include a read-modify-write operation in which data is read from Source Region 102. The method may then depend on the state of the copy process being performed by Host Processor 101.

If the copy process is still in progress, the method may continue from block 506 above by mirroring I/O requests from Root Complex 105. Alternatively, if the copy process has completed, then Root Complex 105 may be programmed to restore it to normal operation (block 508). In various embodiments, the programming includes modifying values in CSRs 109 and may also include re-enabling Address Translation Cache 107, if it was disabled during the relation process. If the virtual machines being executed by system 100 were placed into spin states, the spin states may be disabled upon restoration of Root Complexes 105. The method may then conclude in block 509.

It is noted that the embodiment of the method illustrated in the flow diagram of FIG. 5 is merely an example. In other embodiments, different operations and different orders of operations may be employed.

Figure 6:
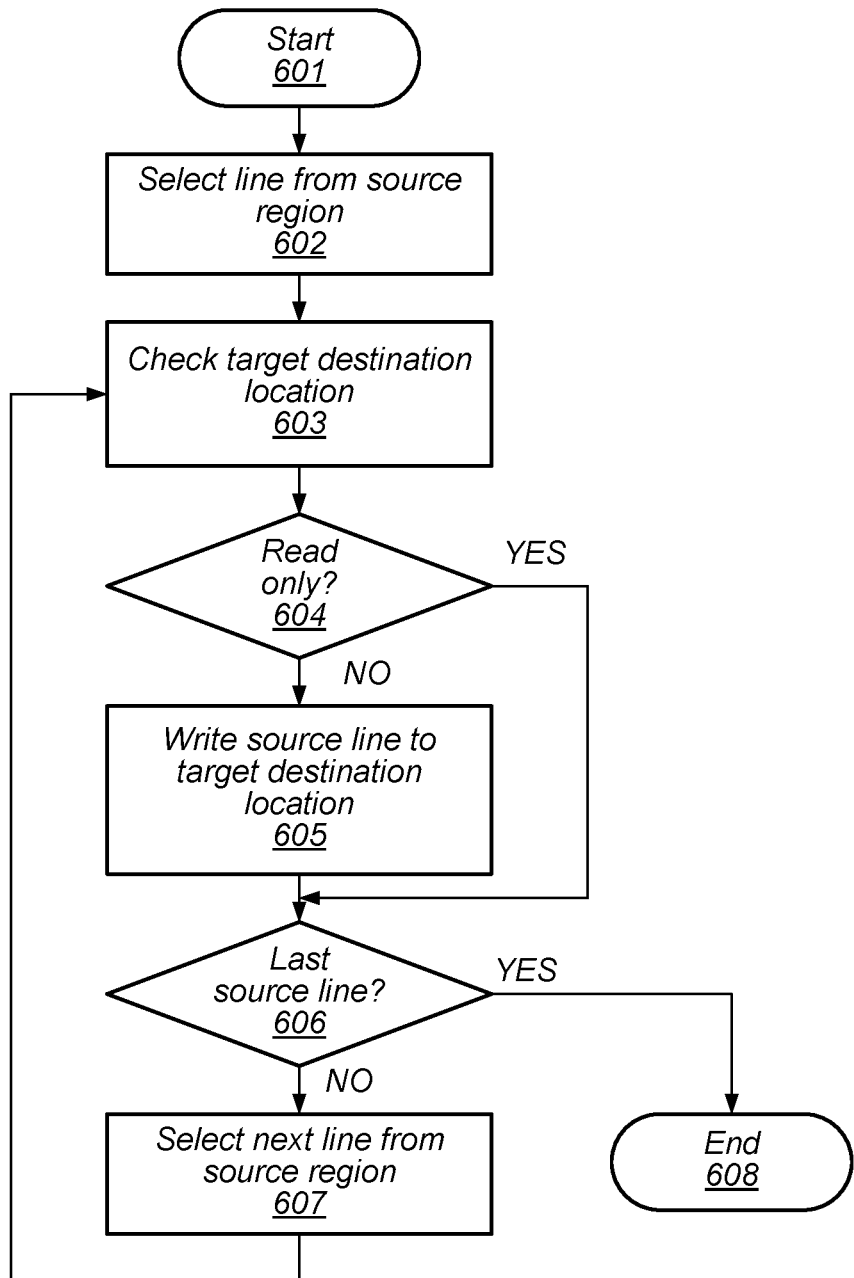
FIG. 6 illustrates a flow diagram depicting an embodiment of a method for software copying from a memory source location to a memory destination location during memory relocation with mirror operation mode enabled.

Turning to FIG. 6, a flow diagram depicting an embodiment of a method for software/firmware copying data from a source region to a destination region during memory reallocation is illustrated. Referring collectively to FIG. 1 and the flow diagram of FIG. 6, the method begins in block 601.

A line from Source Region 102, such as, e.g., Source Line 102A, may then be selected (block 602). In various embodiments, the selection of source lines from Source Region 102 may be sequential, or may employ any other suitable selection method.

A target destination in Destination Region 103 may then be checked (block 603). In some embodiments, metadata or other suitable data bits associated with the target destination may be examined. The values included in the metadata or the other suitable data bits may indicate if the status of the target destination. In some cases, the status may include if the target destination is read-only or if new data may be written to the target destination. The method may then depend on the status of the target destination (block 604).

If the target destination is identified as read-only, then the method may depend on a remaining number of source lines included in Source Region 102 that have not yet been processed (block 606). If the currently selected source line is the last source line in Source Region 102 to be processed, then the method may conclude in block 608.

Alternatively, if additional source lines in Source Region 102 remain to be processed, a new source line in Source Region 102 is selected (block 607). Once the new source line in Region 102 has been selected, the method may proceed from block 603 as described above.

Returning to block 604, if the target destination is not identified as read-only, then the selected source line is written to the target destination (block 605). In various embodiments, metadata or other suitable data bits associated with the target destination may be modified as part of the write operation. Once the write operation has completed, the method may proceed from block 606 as described above.

It is noted that the embodiment of the method depicted in the flow diagram of FIG. 6 is merely an example. In other embodiments, different operations and different orders of operations are possible and contemplated.

As described above, mirroring may be employed during memory relocation. By employing mirroring, memory access requests from devices may be allowed to continue without waiting for the relocation to complete. This allows the computing system to perform without a loss of efficiency and reduces the likelihood of a timeout of a particular memory access request from a given device. Such timeouts may cause system errors and/or limit performance.

Once mirroring is to be enabled, any Root Complexes, such as, e.g., Root Complex 105 as depicted in FIG. 1, need to be properly setup before processing memory access requests. An embodiment of a method for setup of Root Complexes in a computing system for mirror operation is depicted in the flow diagram of FIG. 7. Referring collectively to FIG. 1 and the flow diagram of FIG. 7, the method begins in block 701.

A suspend mode may be enabled (block 702). In various embodiments, the suspend mode may be associated with a transaction layer of the communication between devices in the computing system and the memories or memory controllers within the computing system. For example, in some computing systems, the suspend mode may be associated with the PCIe Transaction Layer. Once the suspend mode has been enabled for a particular Root Complex, incoming memory access requests are blocked by the Root Ports, such as, e.g., Root Ports 108, included in the particular Root Complex.

Each Root Complex in the computing system may then be polled for residual transactions (block 703). In some cases, one or more transactions may have already left a particular root complex. An outstanding cacheable requests (OCR) bit of a status register included in the particular Root Complex may be read. In some embodiments, the OCR bit may be examined multiple times of a period of time until a desired value, such as, e.g., a logical-1, is read, indicating that any residual transactions have completed.

Once any residual transactions have been completed, address ranges for use in mirror operation may then be programmed in the Root Complexes (block 704). In various embodiments, a base physical address for a source region in memory, such as, e.g., Source Region 102, a mirror range indicating how many addresses from the base address are to be mirrored, and a base physical address for a destination region in memory, such as, e.g., Destination Region 103, may be programmed into the Root Complexes of the computing system. The aforementioned information may be programmed into a CSR register in a particular root complex, such as, CSR 109 as illustrated in FIG. 1, for example.

Upon completion of programming the address information into the Root Complexes, programming a mirror bit to an active value may enable mirror operation (block 705). For example, the mirror bit a CSR of a particular Root Complex may be set to a logical-1, or any suitable value.

Suspend mode may then be disabled (block 706). Once suspend mode is disabled, the Root Ports may again allow incoming memory access requests from devices connected to a particular Root Port to resume flowing the particular Root Complex.

Figure 7:
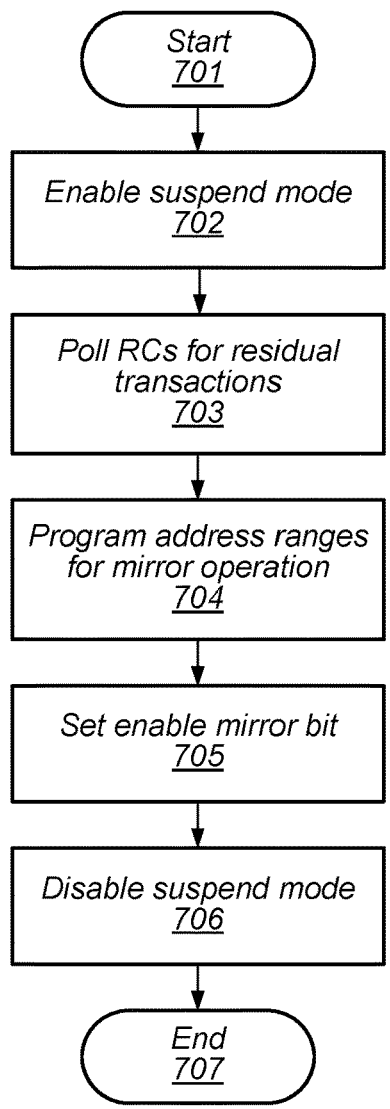
FIG. 7 illustrates a flow diagram depicting an embodiment of a method for programming Root Complexes for mirror operation during memory relocation.

With the disabling of Suspend mode, the method may conclude in block 707. Although the operations included in the embodiment of the method illustrated in FIG. 7 are depicted as being performed in a serial fashion, in other embodiments, one or more of the operations may be performed in parallel.

Upon completion of a memory relocation operation in a computing system, mirroring may be disabled. As part of disabling mirroring, Root Complexes included in the computing system are reset. An embodiment of a method for resetting such Root Complexes is depicted in the flow diagram of FIG. 8. Referring collectively to FIG. 1, and the flow diagram of FIG. 8, the method begins in block 801.

A suspend mode for each Root Complex included in the computing system may be enabled (block 802). As described above, the suspend mode may be associated with a transaction layer of the communication between devices in the computing system and the memories or memory controllers within the computing system, and once the suspend mode has been enabled for a particular Root Complex, incoming memory access requests are blocked by the Root Ports, such as, e.g., Root Ports 108, included in the particular Root Complex.

Once suspend mode has been enabled, the mirror bit in each Root Complex may be set to an inactive value (block 803). After the mirror bit has been set to an inactive value for a particular Root Complex, memory access requests received by the particular Root Complex will be sent only to the destination region of the memory relocation operation.

Upon completion of setting the mirror bits for the Root Complexes to an inactive value, the address translation may be changed in memory to change the mapping of logical addresses so that instead of mapping to the source region, they now map to the destination region. To accomplish the change in mapping, the software may first invalidate the address translation cache entries in each Root Complex, and then reprogram the mapping table in memory (block 804). Suspend mode may then be disabled (block 805). At this point, when the Root Complex handles memory requests that used to map to the source region (prior to the relocation process), the requests will now map to the destination region. The method may then conclude in block 806.

Figure 8:
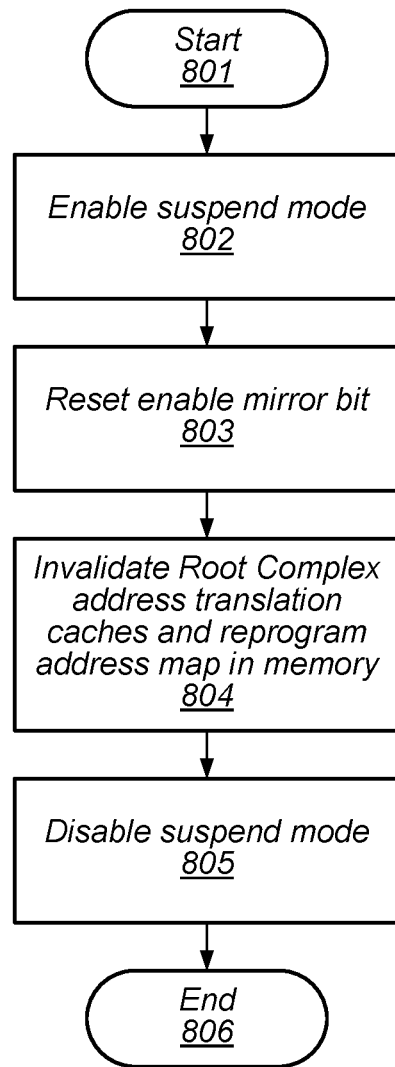
FIG. 8 illustrates a flow diagram depicting an embodiment of a method for programming Root Complexes to restore them to normal operation upon completion of a mirror operation.

It is noted that the embodiment of the method depicted in the flow diagram of FIG. 8 is merely an example. In other embodiments, different operations and different orders of operations may be employed.

Once mirroring is enabled during memory relocation, memory accesses from devices may be processed. An embodiment of method for processing such memory accesses is depicted in the flow diagram of FIG. 9. Referring collectively to FIG. 1 and the flow diagram of FIG. 9, the method begins in block 901.

An I/O memory access request to an address included in Source Region 102 may then be received (block 902). It is noted that if an address associated with an I/O memory access request falls outside of the address range of Source Region 102, the request may be processed normally, without performing the one or more of the special operations depicted in the flow diagram of FIG. 9.

Using the address associated with the I/O memory access request, Root Complex 105 may read, from Source Region 102, the line associated with the address of the I/O memory access request (block 903). In parallel with the read operation, Root Complex may check the version data bits, such as, e.g., Version Data Bits 202, of a line in Destination Region 103 corresponding to the address. The value of the version data bits may be used to determine if the MAP bits associated with the destination line are to be updated. The method may then depend on whether the I/O memory access request is a write request (block 904).

If the I/O memory access is a read request, then the data read by Root Complex 105 from the line associated with the address of the I/O memory access may be returned to the device which initiated the I/O memory access request, such as, Endpoint Device 111A, for example. Once the data has been sent to the device, the method may conclude in block 908.

Alternatively, if the I/O memory access request is a write request, then the method may depend on if the write request is a partial line fill (block 905). If the write request is a full line write request, data included with the I/O memory access request is written to both Source Region 102 and Destination Region 103 at the designated address (block 910).

If the version data bits associated with destination line are the same as the universal match data pattern, Root Complex 105 may modify the MAP bits associated with the destination line to indicate a read-only status. By setting the MAP bits to indicate the destination line is read-only, a source to destination copy, included as part of the system software/firmware relocation operation, will be prevented from overwriting the new data stored as a result of the I/O memory access request. If the version data bits associated with the destination line do not match the universal match data pattern, then Root Complex 105 may preserve the existing value of the MAP bits associated with the destination line. Once the data included in the I/O memory access request has been written to Source Region 102 and Destination Region 103, the method may conclude in block 908.

When the write request is a partial line fill request, Root Complex 105 merges the data received with the I/O memory access request with the data retrieved from Source Region 102 (block 906). Root Complex 105 may then perform a mirror write operation storing the merged data into Source Region 102 and Destination Region 103 (block 907). As above, Root Complex 105 may modify the MAP bits associated with the destination line in Destination Region 103 to indicate read-only status dependent upon the value of the version data bits associated with the destination line. Once the mirror write has been completed, the method may conclude in block 908.

It is noted that in both the full and partial line fill write operations, both are performed as read-modify-write transactions. By using read-modify-write transactions, preserves atomicity of the modifications made to memory contents, and may avoid race conditions and inconsistent behaviors across multiple Root Complexes reading and writing data to Source Region 102.

Figure 9:
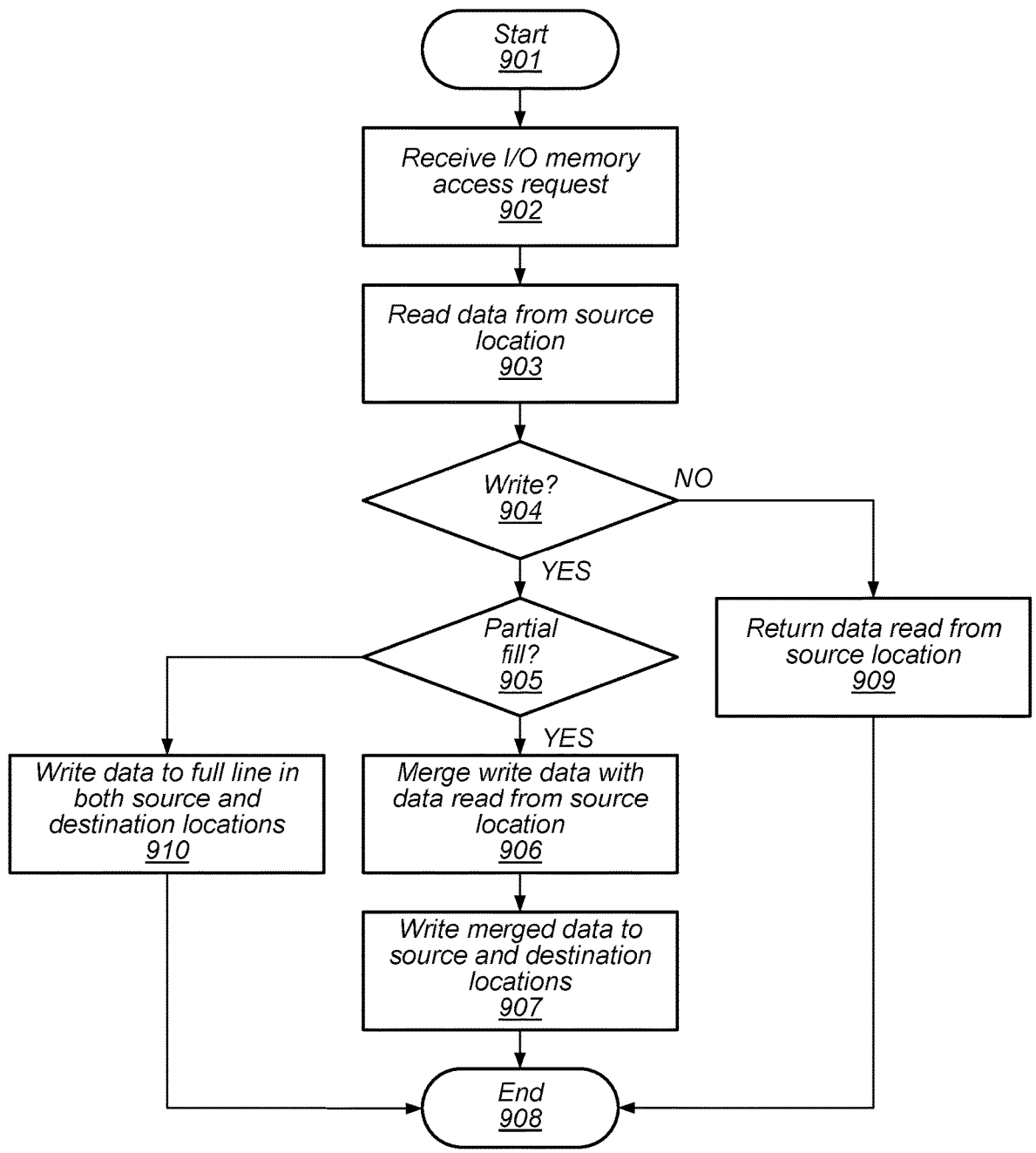
FIG. 9 illustrates a flow diagram depicting an embodiment of a method for processing a memory access requests during mirror operation.

Although the operations included in the method illustrated in the flow diagram of FIG. 9 are depicted as being performed in a sequential fashion, in other embodiments, one or more of the operations may be performed in parallel.

Figure 10:
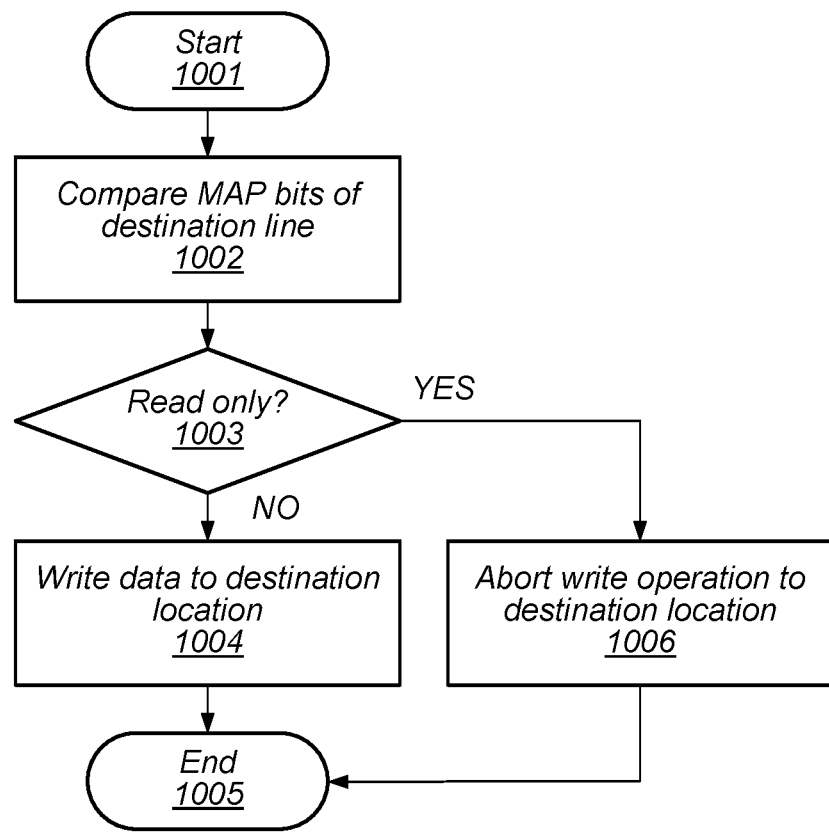
FIG. 10 illustrates a flow diagram depicting an embodiment of a method for software performing a write operation as part of a memory relocation operation with mirror operation mode enabled.

Turning to FIG. 10, a flow diagram depicting an embodiment of a method for performing a write operation during a memory relocation operation. In various embodiments, the method depicted in the flow diagram of FIG. 8 may correspond to block 605 of FIG. 6. Referring collectively to FIG. 1, and the flow diagram of FIG. 10, the method begins in block 1001.

Prior to a write operation being performed, the MAP bits included in a destination line, such as, e.g., Destination Line 103A, may be checked (block 1002). The method may then depend on the data stored in the MAP bits of the destination line (block 1003).

If the MAP bits in the destination line indicate the line is read-only, then the system's software/firmware write operation to the destination line is aborted (block 1006). In various embodiments, a detection of a read-only destination line indicates that an I/O write has already updated the destination location with new data. If the copy of data from the source line was allowed to continue, the newly updated data from the I/O write would be overwritten. Once the write operation has been halted, the method may conclude in block 1005.

Alternatively, if the MAP bits indicate that a write is permitted into the destination line, data from the source line is copied into the destination line (block 1004). In various embodiments, both the data and metadata from the source line are copied to the destination line. Once the data and metadata of the source line have been copied into the destination line, the method may conclude in block 1005.

It is noted that the method depicted in FIG. 10 is merely an example. In other embodiments, different operations and different orders or operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a memory circuit;
   a root complex coupled to a plurality of devices; and
   a processor configured to:
   enable a suspend mode for the root complex;
   in response to a determination that the root complex has no pending transactions, program a plurality of address ranges associated with the memory circuit into the root complex, wherein the plurality of address ranges includes a first address range corresponding to a source region in the memory circuit, and a second address range corresponding to a destination region in the memory circuit;
   in response to a completion of programming the plurality of address ranges, enable a mirror operation in the root complex, wherein the mirror operation using the address ranges; and
   disable the suspend mode for the root complex.

2. The apparatus of claim 1, wherein the processor is further configured to poll the root complex to determine a number of transactions that are pending.

3. The apparatus of claim 1, wherein to program the plurality of address ranges, the processor is further configured to program a first base address for the source region and program a second base address for the destination region.

4. The apparatus of claim 3, wherein the root complex is further configured to read data from the source region in response to receiving a memory access request by the root complex when suspend mode is deactivated.

5. The apparatus of claim 1, wherein the root complex is configured, in response to the suspend mode being enabled, to block one or more requests to access the memory circuit from the plurality of devices.

6. The apparatus of claim 1, wherein the suspend mode is associated with a transaction layer between the plurality of devices and the memory circuit.

7. A method, comprising:
   activating a suspend mode for a root complex included a computer system that includes a plurality of devices and a memory circuit;
   in response to determining the root complex has no pending transactions, programming, in the root complex, address ranges associated with the memory circuit, wherein the address ranges includes a first address range corresponding to a source region in the memory circuit, and a second address range corresponding to a destination region in the memory circuit;
   in response to completing said programming of the address ranges, activating a mirror operation mode for access to the memory circuit, wherein accesses to the source region included in the memory circuit are mirrored to the destination region included in the memory circuit when the mirror operation mode is active; and
   deactivating the suspend mode for the root complex.

8. The method of claim 7, further comprising, polling, by a processor, the root complex to determine a number of transactions to the memory circuit that are pending.

9. The method of claim 7, wherein said programming the address ranges includes programming a first base address for the source region and program a second base address for the destination region.

10. The method of claim 9, further comprising reading data from the source region in response to receiving, by the root complex, a request to access the memory circuit when the suspend mode is deactivated.

11. The method of claim 7, further comprising in response to said activating of the suspend mode, blocking by the root complex is configured, one or more requests to access the memory circuit from the plurality of devices.

12. The method of claim 11, wherein one or more access requests to access the memory circuit are associated with a transaction layer between the plurality of devices and the memory circuit.

13. The method of claim 7, further comprising, copying one or more lines from the source region to the destination region in response to initiating a memory relocation operation.

14. An apparatus, comprising:
   a memory circuit;
   a plurality of devices;
   a communication circuit including a plurality of registers and a plurality of ports; and
   a processor configured to:
   activate a suspend mode for the communication circuit;
   in response to a determination that the communication circuit has no pending transactions, program a plurality of address ranges associated with the memory circuit into the communication circuit, wherein the plurality of address ranges includes a first address range corresponding to a source region in the memory circuit, and a second address range corresponding to a destination region in the memory circuit;
   in response to a completion of programming the plurality of address ranges, enable a mirror operation in the communication circuit, wherein the mirror operation using the plurality of address ranges; and
   deactivate the suspend mode for the communication circuit.

15. The apparatus of claim 14, wherein the processor is further configured to poll at least one of status registers to determine a number of transactions that are pending.

16. The apparatus of claim 14, wherein to program the plurality of address ranges, the processor is further configured to:
   store, in a first register of the plurality of registers, a first base address for the source region; and
   store, in a second register of the plurality of registers, a second base address for the destination region.

17. The apparatus of claim 16, wherein the communication circuit is further configured to read data from the source region in response to receiving a memory access request by the communication circuit when the suspend mode is deactivated.

18. The apparatus of claim 14, further comprising a cache memory configured to store and address translation table, and wherein the processor is further configured to modify the address translation table in response to the completion of programming the plurality of address ranges.

19. The apparatus of claim 14, wherein the plurality of ports, in response to the suspend mode being enabled, to block one or more requests to access the memory circuit from the plurality of devices.

20. The apparatus of claim 14, wherein one or more requests to access the memory circuit are associated with a transaction layer between the plurality of devices and the memory circuit.

* * * * *